(12) United States Patent
Tsujimura et al.

(10) Patent No.: US 9,193,622 B2
(45) Date of Patent: Nov. 24, 2015

(54) ALKALI FREE GLASS AND METHOD FOR PRODUCING ALKALI FREE GLASS

(71) Applicant: ASAHI GLASS COMPANY, LIMITED, Chiyoda-ku (JP)

(72) Inventors: Tomoyuki Tsujimura, Tokyo (JP); Manabu Nishizawa, Tokyo (JP); Akio Koike, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 32 days.

(21) Appl. No.: 13/912,642

(22) Filed: Jun. 7, 2013

(65) Prior Publication Data

US 2013/0274086 A1    Oct. 17, 2013

Related U.S. Application Data

(63) Continuation of application No. PCT/JP2011/077960, filed on Dec. 2, 2011.

(30) Foreign Application Priority Data

Dec. 7, 2010    (JP) .................................. 2010-272674

(51) Int. Cl.
    *C03C 3/091*    (2006.01)
    *C03C 3/087*    (2006.01)

(52) U.S. Cl.
    CPC ................. *C03C 3/091* (2013.01); *C03C 3/087* (2013.01)

(58) Field of Classification Search
    CPC ............................. C03C 3/087; C03C 3/091
    USPC ...................................................... 501/66, 70
    See application file for complete search history.

(56) References Cited

U.S. PATENT DOCUMENTS

| 5,326,730 | A | 7/1994 | Dumbaugh, Jr. et al. |
| 6,329,310 | B1 * | 12/2001 | Peuchert et al. ................ 501/66 |
| 8,431,503 | B2 | 4/2013 | Nagai et al. |

FOREIGN PATENT DOCUMENTS

| CN | 101808951 A | 8/2010 |
| JP | 61-236631 | 10/1986 |
| JP | 61-281041 A | 12/1986 |
| JP | 62-100450 | 5/1987 |
| JP | 62-113735 | 5/1987 |
| JP | 04-325435 | 11/1992 |
| JP | 05-232458 | 9/1993 |
| JP | 10-045422 | 2/1998 |
| TW | 200927686 A | 7/2009 |
| WO | 2009/054314 | 4/2009 |

OTHER PUBLICATIONS

U.S. Appl. No. 13/928,617, filed Jun. 27, 2013, Tsujimura, et al.
U.S. Appl. No. 14/048,382, filed Oct. 8, 2013, Tsujimura, et al.
International Search Report issued on Feb. 7, 2012 in PCT/JP2011/077960 filed Feb. 2, 2012.

* cited by examiner

*Primary Examiner* — Anthony J Green
*Assistant Examiner* — Elizabeth A Bolden
(74) *Attorney, Agent, or Firm* — Oblon, McClelland, Maier & Neustadt, L.L.P.

(57) ABSTRACT

The present invention relates to an alkali-free glass having a strain point of 725° C. or higher, an average thermal expansion coefficient at from 50 to 300° C. of from $30 \times 10^{-7}$ to $40 \times 10^{-7}/°$ C., a temperature $T_2$ at which a glass viscosity is $10^2$ dPa·s of 1,710° C. or lower, and a temperature $T_4$ at which a glass viscosity is $10^4$ dPa·s of 1,320° C. or lower, the alkali-free glass including, in terms of mol % on the basis of oxides, $SiO_2$: 66 to 70, $Al_2O_3$: 12 to 15, $B_2O_3$: 0 to 1.5, MgO: more than 9.5 and 13 or less, CaO: 4 to 9, SrO: 0.5 to 4.5, BaO: 0 to 1, and $ZrO_2$: 0 to 2, in which MgO+CaO+SrO+BaO is from 17 to 21, MgO/(MgO+CaO+SrO+BaO) is 0.4 or more, MgO/(MgO+CaO) is 0.4 or more, MgO/(MgO+SrO) is 0.6 or more, and the alkali-free glass does not substantially contain an alkali metal oxide.

6 Claims, No Drawings

ALKALI FREE GLASS AND METHOD FOR PRODUCING ALKALI FREE GLASS

CROSS-REFERENCE TO RELATED APPLICATIONS

This application is a continuation of PCT/JP2011/077960 filed on Dec. 2, 2011. This application is based upon and claims the benefit of priority to Japanese Application No. 2010-272674 filed on Dec. 7, 2010, the content of which is incorporated herein by reference in its entirety.

TECHNICAL FIELD

The present invention relates to an alkali-free glass that is suitable as various substrate glasses for a display and substrate glasses for a photomask, does not substantially contain an alkali metal oxide and can be subjected to float forming.

BACKGROUND OF THE INVENTION

The following characteristics have conventionally been required in various substrate glasses for a display, particularly substrate glasses having a metal or an oxide thin film formed on the surface thereof.

(1) In the case where an alkali metal oxide is contained, alkali metal ions diffuse in the thin film, resulting in deterioration of film characteristics. For this reason, alkali metal ions are not substantially contained.

(2) A strain point is high such that deformation of a glass and shrinkage (thermal shrinkage) due to structure stabilization of a glass can be minimized when exposed to high temperature in a thin film formation step.

(3) A glass has sufficient chemical durability to various chemicals used in semiconductor formation. Particularly, the glass has durability to buffered hydrofluoric acid (BHF: mixed liquid of hydrofluoric acid and ammonium fluoride) for etching $SiO_x$ or $SiN_x$, a medicinal solution containing hydrochloric acid used for etching ITO, various acids (nitric acid, sulfuric acid and the like) used for etching an metal electrode, and an alkaline of a resist stripping solution.

(4) Defects (bubble, striae, inclusion, pit, flaw and the like) are not present in the inside and on the surface.

In addition to the above requirements, the recent years are under following situations.

(5) Reduction in weight of a display is required, and a glass itself is required to have small density.

(6) Reduction in weight of a display is required, and decrease in thickness of a substrate glass is desired.

(7) In addition to the conventional amorphous silicon (a-Si) type liquid crystal display, a polycrystal silicon (p-Si) type liquid crystal display in which heat treatment temperature is slightly high has began to be produced (a-Si: about 350° C.→p-Si: 350 to 550° C.).

(8) A glass having small average thermal expansion coefficient is required in order to improve productivity and increasing thermal shock resistance by increasing a temperature-rising rate in a heat treatment for liquid display preparation.

On the other hand, dry etching progresses and requirement to BHF resistance is becoming weakened. Many glasses conventionally used are glasses containing 6 to 10 mol % of $B_2O_3$ in order to improve BHF resistance. However, $B_2O_3$ has the tendency to decrease a strain point. The following glasses are exemplified as an alkali-free glass that does not contain $B_2O_3$ or contains $B_2O_3$ in small amount.

Patent Document 1 discloses $SiO_2$—$Al_2O_3$—SrO glass that does not contain $B_2O_3$. However, a temperature required for melting is high, and this causes difficulty in production.

Patent Document 2 discloses $SiO_2$—$Al_2O_3$—SrO crystallized glass that does not contain $B_2O_3$. However, a temperature required for melting is high, and this causes difficulty in production.

Patent Document 3 discloses a glass containing $B_2O_3$ in an amount of from 0 to 3% by weight. However, an average thermal expansion coefficient at from 50 to 300° C. exceeds $40\times10^{-7}$/° C.

Patent Document 4 discloses a glass containing $B_2O_3$ in an amount of from 0 to 5 mol %. However, an average thermal expansion coefficient at from 50 to 300° C. exceeds $50\times10^{-7}$/° C.

Patent Document 5 discloses a glass containing $B_2O_3$ in an amount of from 0 to 5 mol %. However, thermal expansion is large and density is also large.

To solve the problems in the glasses described in Patent Documents 1 to 5, an alkali-free glass described in Patent Document 6 is proposed. The alkali-free glass described in Patent Document 6 has high strain point, can be formed by a float process, and is considered to be suitable for uses such as a display substrate and a photomask substrate.

A production method of high quality p-Si TFT includes a solid phase crystallization method. However, to carry out the method, it is required to further increase a strain point.

On the other hand, to comply with the demand in glass production process, particularly melting and forming, a glass is required to have lower viscosity, particularly lower temperature $T_4$ at which a glass viscosity is $10^4$ dPa·s.

BACKGROUND ART

Patent Documents

Patent Document 1: JP-A-62-113735
Patent Document 2: JP-A-62-100450
Patent Document 3: JP-A-4-325435
Patent Document 4: JP-A-5-232458
Patent Document 5: U.S. Pat. No. 5,326,730
Patent Document 6: JP-A-10-45422

SUMMARY OF THE INVENTION

Problems that the Invention is to Solve

An object of the present invention is to provide an alkali-free glass that solves the above disadvantages, has high strain point and low viscosity, particularly low temperature $T_4$ at which a glass viscosity is $10^4$ dPa·s, and is easily subjected to float forming.

Means for Solving the Problems

The present invention provides an alkali-free glass having a strain point of 725° C. or higher, an average thermal expansion coefficient at from 50 to 300° C. of from $30\times10^{-7}$ to $40\times10^{-7}$/° C., a temperature $T_2$ at which a glass viscosity is $10^2$ dPa·s of 1,710° C. or lower, and a temperature $T_4$ at which a glass viscosity is $10^4$ dPa·s of 1,320° C. or lower, the alkali-free glass comprising, in terms of mol % on the basis of oxides:

| | |
|---|---|
| SiO$_2$ | 66 to 70, |
| Al$_2$O$_3$ | 12 to 15, |
| B$_2$O$_3$ | 0 to 1.5, |
| MgO | more than 9.5 and 13 or less, |
| CaO | 4 to 9, |
| SrO | 0.5 to 4.5, |
| BaO | 0 to 1, and |
| ZrO$_2$ | 0 to 2, | wherein MgO+CaO+SrO+BaO is from 17 to 21, MgO/(MgO+CaO+SrO+BaO) is 0.4 or more, MgO/(MgO+CaO) is 0.4 or more, MgO/(MgO+SrO) is 0.6 or more, and the alkali-free glass does not substantially contain an alkali metal oxide.

The present invention provides an alkali-free glass having a strain point of 725° C. or higher, an average thermal expansion coefficient at from 50 to 300° C. of from 30×10$^{-7}$ to 40×10$^{-7}$/° C., a temperature T$_2$ at which a glass viscosity is 10$^2$ dPa·s of 1,710° C. or lower, and a temperature T$_4$ at which a glass viscosity is 10$^4$ dPa·s of 1,320° C. or lower, the alkali-free glass comprising, in terms of mol % on the basis of oxides:

| | |
|---|---|
| SiO$_2$ | 66 to 70, |
| Al$_2$O$_3$ | 12 to 15, |
| B$_2$O$_3$ | 0 to 1.5, |
| MgO | 5 to 9.5, |
| CaO | 4 to 11, |
| SrO | 0.5 to 4.5, |
| BaO | 0 to 1, and |
| ZrO$_2$ | 0 to 2, | wherein MgO+CaO+SrO+BaO is more than 18.2 and 21 or less, MgO/(MgO+CaO+SrO+BaO) is 0.25 or more, MgO/(MgO+CaO) is 0.3 or more, MgO/(MgO+SrO) is 0.6 or more, Al$_2$O$_3$×(MgO/(MgO+CaO+SrO+BaO)) is 5.5 or more, and the alkali-free glass does not substantially contain an alkali metal oxide.

Advantage of the Invention

The alkali-free glass of the present invention is a glass that is suitable for a display substrate, a photomask substrate and the like that are for uses at high strain point, and is easily subjected to float forming.

MODE FOR CARRYING OUT THE INVENTION

Composition range of each component is described below. In the case where SiO$_2$ is less than 66% (mol %; unless otherwise indicated, thereinafter the same), a strain point is not sufficiently increased, a thermal expansion coefficient is increased and a density is increased. In the case where the amount exceeds 70%, a melting performance is decreased, and a devitrification temperature is increased. The amount is preferably from 67 to 70%.

Al$_2$O$_3$ inhibits phase separation property of a glass, decreases a thermal expansion coefficient and increases a strain point. However, in the case where the amount is less than 12%, the effect is not achieved, and other components increasing expansion are increased. As a result, a thermal expansion becomes large. In the case where the amount exceeds 15%, a melting performance of a glass may be deteriorated, and a devitrification temperature may be increased. Therefore, the amount is preferably 14.5% or less, more preferably 14% or less, and still more preferably from 12.2 to 13.8%.

B$_2$O$_3$ improves a melting reaction property of a glass, and decreases a devitrification temperature. Therefore, B$_2$O$_3$ can be added up to 1.5%. However, in the case where the amount is too large, a strain point is decreased. Therefore, the amount is preferably 1% or less. Considering environmental load, it is preferred that B$_2$O$_3$ is not substantially contained.

MgO has the characteristics that it does not increase expansion and does not excessively decrease a strain point, among alkali earths. MgO also improves a melting performance.

In a first embodiment of the alkali-free glass of the present invention, the MgO content is more than 9.5% and 13% or less. In the case where the amount is 9.5% or less, the effect by the addition of MgO as described above is not achieved. However, in the case where the amount exceeds 13%, a devitrification temperature may be increased. The amount is more preferably 12.5% or less, 12% or less, and 11.5% or less.

On the other hand, in a second embodiment of the alkali-free glass of the present invention, the MgO content is from 5 to 9.5%. In the case where the amount is less than 5%, the effect by the addition of MgO as described above is not achieved. The amount is more preferably 6% or more, and 7% or more. However, in the case where the amount exceeds 9.5%, a devitrification temperature may be increased. The amount is more preferably 9.3% or less, and 9% or less.

CaO has the characteristics that it does not increase expansion and does not excessively decrease a strain point, next to MgO among alkali earths. CaO also improves a melting performance.

In the first embodiment of the alkali-free glass of the present invention, the CaO content is from 4 to 9%. In the case where the content is less than 4%, the effect by the addition of CaO as described above is not sufficiently achieved. However, in the case where the content exceeds 9%, a devitrification temperature may be increased and a phosphorus that is impurities in lime (CaCO$_3$) that is CaO raw material may be incorporated in large amount. The content is more preferably 7% or less, 6% or less and 5% or less.

On the other hand, in the second embodiment of the alkali-free glass of the present invention, the CaO content is from 4 to 11%. In the case where the content is less than 4%, the effect by the addition of CaO as described above is not sufficiently achieved. The content is preferably 5% or more. However, in the case where the content exceeds 11%, a devitrification temperature may be increased and a phosphorus that is impurities in lime (CaCO$_3$) that is CaO raw material may be incorporated in large amount. The content is more preferably 10% or less, 9% or less, 7% or less and 6% or less.

SrO improves a melting performance without increasing a devitrification temperature of a glass. In the case where the content is less than 0.5%, the effect is not sufficiently achieved. The content is preferably 1.0% or more, and more preferably 2.0% or more. However, in the case where the content exceeds 4.5%, an expansion coefficient may be increased. The content is preferably 4.0% or less, and 3.5% or less.

BaO is not essential, but can be contained to improve a melting performance. However, in the case where the content is too large, an expansion and a density of a glass are excessively increased. Therefore, the content is 1% or less. The content is more preferably 0.5% or less, and it is preferred that BaO is not substantially contained.

ZrO$_2$ may be contained up to 2% in order to decrease a glass melting temperature. In the case where the content exceeds 2%, a glass becomes unstable, or dielectric constant ∈ of a glass is increased. The content is preferably 1.5% or less.

In the first embodiment of the alkali-free glass of the present invention, in the case where the total content of MgO, CaO, SrO and BaO is less than 17%, a melting performance becomes poor. In the case where the total content is more than 21%, there may be a difficulty that a thermal expansion coefficient cannot be decreased. The total content is preferably 18% or more, and 20% or less.

On the other hand, in the second embodiment of the alkali-free glass of the present invention, in the case where the total content of MgO, CaO, SrO and BaO is 18.2% or less, a melting performance becomes poor. In the case where the total content is 21% or more, there may be a difficulty that a thermal expansion coefficient cannot be decreased. The total content is preferably 20% or less.

In the first embodiment of the alkali-free glass of the present invention, when the total content of MgO, CaO, SrO and BaO satisfies the above and the following three requirements are satisfied, a strain point can be increased without increasing a devitrification temperature, and additionally, a viscosity of a glass, particularly a temperature $T_4$ at which the glass viscosity is $10^4$ dPa·s, can be decreased.

MgO/(MgO+CaO+SrO+BaO) is 0.4 or more, and preferably 0.45 or more.

MgO/(MgO+CaO) is 0.4 or more, preferably 0.52 or more, and more preferably 0.55 or more.

MgO/(MgO+SrO) is 0.6 or more, and preferably 0.7 or more.

In the second embodiment of the alkali-free glass of the present invention, when the total content of MgO, CaO, SrO and BaO satisfies the above and the following three requirements are satisfied, a strain point can be increased without increasing a devitrification temperature, and additionally, a viscosity of a glass, particularly a temperature $T_4$ at which the glass viscosity is $10^4$ dPa·s, can be decreased.

MgO/(MgO+CaO+SrO+BaO) is 0.25 or more, preferably 0.3 or more, more preferably 0.4 or more, and still more preferably 0.45 or more.

MgO/(MgO+CaO) is 0.3 or more, preferably 0.4 or more, more preferably 0.52 or more, and still more preferably 0.55 or more.

MgO/(MgO+SrO) is 0.6 or more, and preferably 0.7 or more.

In the second embodiment of the alkali-free glass of the present invention, when $Al_2O_3 \times (MgO/(MgO+CaO+SrO+BaO))$ is 5.5 or more, a Young's modulus is increased, which is preferred. $Al_2O_3 \times (MgO/(MgO+CaO+SrO+BaO))$ is preferably 5.75 or more, more preferably 6.0 or more, still more preferably 6.25 or more, and particularly preferably 6.5 or more.

Incidentally, the alkali-free glass of the present invention does not contain an alkali metal oxide in a content exceeding an impurity level (that is, does not substantially contain) in order to avoid the occurrence of deterioration in characteristics of a metal or a thin oxide film provided on a glass surface during panel production. For the same reason, it is preferred that $P_2O_5$ is not substantially contained. Furthermore, to facilitate recycle of a glass, it is preferred that PbO, $As_2O_3$ and $Sb_2O_3$ are not substantially contained.

In addition of the above components, to improve a melting performance, a refining and a formability (float formability) of a glass, ZnO, $Fe_2O_3$, $SO_3$, F, Cl and $SnO_2$ can be added in the total amount of 5% or less.

The alkali-free glass of the present invention has a strain point of 725° C. or higher, and preferably higher than 730° C., and therefore a thermal shrinkage during panel production can be suppressed. Further, solid phase crystallization method can be applied as a production method of p-Si TFT.

In the alkali-free glass of the present invention, the strain point is more preferably 735° C. or higher. When the strain point is 735° C. or higher, the glass is suitable for uses at high strain point (for example, a display substrate or a lighting substrate for an organic EL, or a thin display substrate or a lighting substrate, having a thickness of 100 μm or less).

Forming of a sheet glass having a thickness of 100 μm or less has the tendency that drawing rate during forming becomes fast. As a result, a fictive temperature of a glass is increased, and a compaction of a glass is increased easily. In this case, when a glass is a high strain point glass, the compaction can be inhibited.

Also, the alkali-free glass of the present invention has a glass transition point of preferably 760° C. or higher, more preferably 770° C. or higher, and still more preferably 780° C. or higher.

Moreover, the alkali-free glass of the present invention has an average thermal expansion coefficient at 50 to 300° C. of from $30 \times 10^{-7}$ to $40 \times 10^{-7}$/° C., has a large thermal shock resistance and can increase productivity when producing a panel. It is preferred in the alkali-free glass of the present invention that the average thermal expansion coefficient at 50 to 300° C. is from $35 \times 10^{-7}$ to $40 \times 10^{-7}$/° C.

Furthermore, the alkali-free glass of the present invention has a specific gravity of preferably 2.65 or less, more preferably 2.64 or less, and still more preferably 2.62 or less.

Moreover, according to the alkali-free glass of the present invention, a temperature $T_2$ at which viscosity η is $10^2$ poise (dPa·s) is 1,710° C. or lower, preferably lower than 1,710° C., more preferably 1,700° C. or lower and still more preferably 1,690° C. or lower. Therefore, melting of the glass is relatively easy.

Furthermore, according to the alkali-free glass of the present invention, a temperature $T_4$ at which viscosity η is $10^4$ poise is 1,320° C. or lower, preferably 1,315° C. or lower, more preferably 1,310° C. or lower, and still more preferably 1,305° C. or lower. Therefore, it is suitable for float forming.

When the alkali-free glass of the present invention has a devitrification temperature of 1,350° C. or lower, forming by a float process becomes easy, which is preferred. The devitrification temperature is preferably 1,340° C. or lower, and more preferably 1,330° C. or lower.

The devitrification temperature in the present description is an average value of a maximum temperature at which crystals precipitate on the surface of a glass and in the inside thereof, and a minimum temperature at which crystals do not precipitate, by placing crushed glass particles on a platinum dish, conducting heat treatment for 17 hours in an electric furnace controlled to constant temperature, and observing with an optical microscope after the heat treatment.

Also, the alkali-free glass of the present invention preferably has a Young's modulus of 84 GPa or more, furthermore 86 GPa or more, furthermore 88 GPa or more, and furthermore 90 GPa or more.

Moreover, the alkali-free glass of the present invention preferably has a photoelastic constant of 31 nm/MPa/cm or less.

When a glass substrate has a birefringence by stress generated in a liquid crystal display panel production step and during using a liquid crystal display, display of black becomes gray, and the phenomenon that contrast of a liquid crystal display is decreased is sometimes recognized. When the photoelastic constant is 31 nm/MPa/cm or less, this phenomenon can be inhibited small. The photoelastic constant is preferably 30 nm/MPa/cm or less, more preferably 29 nm/MPa/cm or less, still more preferably 28.5 nm/MPa/cm or less, and particularly preferably 28 nm/MPa/cm or less.

Considering easiness of securing other properties, the photoelastic constant is preferably 25 nm/MPa/cm or less.

The photoelastic constant can be measured by a disk compression method.

Also, the alkali-free glass of the present invention preferably has a dielectric constant of 5.6 or more.

In the case of In-Cell type touch panel (touch sensor is incorporated in a liquid crystal display panel) as described in JP-A-2011-70092, it is better that the glass substrate has higher dielectric constant from the standpoints of improvement in sensing sensitivity of a touch sensor, decrease in drive voltage and electric power saving. When the dielectric constant is 5.6 or more, sensing sensitivity of a touch sensor is improved. The dielectric constant is preferably 5.8 or more, more preferably 6.0 or more, still more preferably 6.2 or more, and particularly preferably 6.4 or more.

The dielectric constant can be measured according to the method described in JIS C-2141 (1992).

The alkali-free glass of the present invention can be produced by, for example, the following method. Raw materials of each component generally used are mixed so as to obtain a target component, and the resulting mixture is continuously introduced in a melting furnace, and heated at from 1,500 to 1,800° C. to melt the same. The molten glass obtained is formed into a given sheet thickness by a float process, followed by annealing and cutting. Thus, a sheet glass can be obtained.

The alkali-free glass of the present invention has relatively low melting performance. Therefore, the following materials are preferably used as raw materials of each component.

(Silicon Source)

Silica sand can be used as a silicon source of $SiO_2$. When silica sand, in which a median diameter $D_{50}$ is from 20 to 27 μm, the proportion of particles having a particle size of 2 μm or less is 0.3% by volume or less and the proportion of particles having a particle size of 100 μm or more is 2.5% by volume or less, is used, the silica sand can be melted while inhibiting the aggregation of the silica sand. This facilitates melting of the silica sand, and an alkali-free glass having less bubbles and having high homogeneity and flatness is obtained, which is preferred.

Incidentally, the "particle size" in the present specification means a sphere equivalent size (primary particle size in the present invention) of silica sand, and is specifically a particle size in particle size distribution of a powder measured by a laser diffraction/scattering method.

Moreover, the "median diameter $D_{50}$" in the present specification means a particle size where, in particle size distribution of a powder measured by a laser diffraction method, volume frequency of particles having a particle size larger than a certain particle size occupies 50% of that of the whole powder. In other words, the "median diameter $D_{50}$" means a particle size when the cumulative frequency is 50% in particle size distribution of a powder measured by a laser diffraction method.

The "proportion of particles having a particle size of 2 μm or less" and the "proportion of particles having a particle size of 100 μm or more" in the present specification are measured by particle size distribution with, for example, laser diffraction/scattering method.

It is preferred that the median diameter $D_{50}$ of silica sand is 25 μm or less because melting of the silica sand becomes easier.

Moreover, it is particularly preferred that the proportion of particles having a particle size of 100 μm or more in silica sand is 0% because melting of the silica sand becomes easier.

(Alkaline Earth Metal Source)

An alkali earth metal compound can be used as the alkaline earth metal source. Specific examples of the alkaline earth metal compound include carbonates such as $MgCO_3$, $CaCO_3$, $BaCO_3$, $SrCO_3$ and (Mg, Ca)$CO_3$ (dolomite); oxides such as MgO, CaO, BaO and SrO; and hydroxides such as $Mg(OH)_2$, $Ca(OH)_2$, $Ba(OH)_2$ and $Sr(OH)_2$. When a hydroxide of an alkaline earth metal is contained in a part or the whole of the alkaline earth metal source, the amount of unmelted $SiO_2$ component during melting glass raw materials is decreased, which is preferred. In the case where the amount of unmelted $SiO_2$ component contained in silica sand is increased, the unmelted $SiO_2$ is incorporated in bubbles when the bubbles are generated in a glass melt, and accumulates near the surface layer of the glass melt. This causes difference in compositional ratio of $SiO_2$ between the surface layer of the glass melt and part other than the surface layer. As a result, homogeneity of a glass is deteriorated, and additionally, flatness is decreased.

The content of the hydroxide in the alkaline earth metal is preferably from 15 to 100 mol % (in terms of MO), more preferably from 30 to 100 mol % (in terms of MO), and still more preferably from 60 to 100 mol % (in terms of MO), of 100 mol % of the alkaline earth metal source (in terms of MO, provided that M is an alkaline earth metal element). When the content falls within the range, the amount of the unmelted $SiO_2$ during melting glass raw materials is decreased, which is more preferred.

The amount of the unmelted $SiO_2$ during melting glass raw materials is decreased with increasing molar ratio of the hydroxide in the alkaline earth metal source. Therefore, higher molar ratio of the hydroxide is preferred.

Specifically, a mixture of a hydroxide of an alkaline earth metal and a carbonate, a hydroxide alone of an alkaline earth metal, and the like can be used as the alkaline earth metal source. At least one of $MgCO_3$, $CaCO_3$, and (Mg, Ca)$(CO_3)_2$ (dolomite) is preferably used as the carbonate. At least one of $Mg(OH)_2$ and $Ca(OH)_2$ is preferably used as the hydroxide of the alkaline earth metal. $Mg(OH)_2$ is particularly preferably used.

(Boron Source)

When the alkali-free glass contains $B_2O_3$, a boron compound can be used as the boron source of $B_2O_3$. Specific examples of the boron compound include orthoboric acid ($H_3BO_3$), metaboric acid ($HBO_2$), tetraboric acid ($H_2B_4O_7$) and boric anhydride ($B_2O_3$). In the production of general alkali-free glass, orthoboric acid is used from the standpoints of inexpensive cost and easy availability.

In the present invention, the boron source preferably contains boric anhydride in a content of from 10 to 100 mass % (in terms of $B_2O_3$) of 100 mass % (in terms of $B_2O_3$) of the boron source. When the boric anhydride contained is 10 mass % or more, aggregation of glass materials is inhibited, and improvement effect in reduction of bubbles, homogeneity and flatness is obtained. The content of the boric anhydride is more preferably from 20 to 100 mass %, and still more preferably from 40 to 100 mass %.

As a boron compound other than boric anhydride, orthobaric acid is preferred from the standpoints of inexpensive cost and easy availability.

EXAMPLES

In the following examples, Examples 1 to 11 and 14 to 31 are Working Examples, and Examples 12 and 13 are Comparative Examples. Raw materials of each component were mixed so as to obtain a target composition, and melted at a temperature of from 1,500 to 1,600° C. using a platinum crucible. In melting, stirring was conducted using a platinum stirrer to homogenize a glass. The molten glass was flown out, and formed in a plate shape, followed by annealing.

Tables 1 to 5 show glass composition (unit: mol %), thermal expansion coefficient at 50 to 300° C. (unit: ×10$^{-7}$/° C.), strain point (unit: ° C.), glass transition point (unit: ° C.), specific gravity, Young's modulus (GPa) (measured by ultrasonic method), temperature $T_2$ (temperature at which a glass viscosity η is 10$^2$ poise, unit: ° C.) giving an indication of melting performance and temperature $T_4$ (temperature at which a glass viscosity η is 10$^4$ poise, unit: ° C.) giving an indication of float formability and fusion formability, as high temperature viscosity values, devitrification temperature (unit: ° C.), photoelastic constant (unit: nm/MPa/cm) (measured by disk compression method) and dielectric constant (measured by the method described in JIS C-2141).

Incidentally, in Tables 1 to 5, values in parentheses are calculated values.

TABLE 1

| Mol % | Example 1 | Example 2 | Example 3 | Example 4 | Example 5 | Example 6 | Example 7 |
|---|---|---|---|---|---|---|---|
| SiO$_2$ | 67.4 | 68.4 | 68.4 | 67.9 | 67.4 | 68.4 | 68.4 |
| Al$_2$O$_3$ | 13.5 | 13.5 | 13.5 | 13.5 | 13.5 | 13.5 | 13.5 |
| B$_2$O$_3$ | 0 | 0 | 0 | 0 | 0 | 0 | 0 |
| MgO | 10.7 | 10.7 | 10.0 | 10.5 | 11.7 | 11.0 | 9.7 |
| CaO | 5.2 | 5.2 | 7.1 | 7.1 | 4.2 | 6.1 | 5.2 |
| SrO | 3.2 | 2.2 | 1.0 | 1.0 | 3.2 | 1.0 | 4.2 |
| BaO | 0 | 0 | 0 | 0 | 0 | 0 | 0 |
| ZrO$_2$ | 0 | 0 | 0 | 0 | 0 | 0 | 0 |
| MgO + CaO + SrO + BaO | 19.1 | 18.1 | 18.1 | 18.6 | 19.1 | 18.1 | 19.1 |
| MgO/(MgO + CaO + SrO + BaO) | 0.56 | 0.6 | 0.6 | 0.6 | 0.6 | 0.6 | 0.5 |
| MgO/(MgO + CaO) | 0.67 | 0.7 | 0.6 | 0.6 | 0.7 | 0.6 | 0.7 |
| MgO/(MgO + SrO) | 0.77 | 0.8 | 0.9 | 0.9 | 0.8 | 0.9 | 0.7 |
| Al$_2$O$_3$ × (MgO/(MgO + CaO + SrO + BaO)) | 7.56 | 0.6 | 0.6 | 0.6 | 0.6 | 0.6 | 0.5 |
| Average thermal expansion coefficient (×10$^{-7}$/° C.) | 37.0 | 34.7 | 35.3 | 37.9 | 37.9 | 35.5 | 37.7 |
| Strain point (° C.) | (731) | (743) | (740) | (741) | (734) | (743) | (734) |
| Glass transition point (° C.) | 783 | 795 | 792 | 793 | 786 | 795 | 787 |
| Specific gravity | 2.57 | 2.55 | 2.54 | 2.54 | 2.57 | 2.53 | 2.59 |
| Young's modulus (GPa) | (90.2) | (89.5) | (88.1) | (89.5) | 89.6 | (89.1) | (90.1) |
| $T_2$ (° C.) | 1648 | (1677) | (1686) | (1673) | (1645) | (1682) | 1652 |
| $T_4$ (° C.) | 1307 | (1314) | (1301) | (1291) | (1293) | (1298) | 1310 |
| Devitrification temperature (° C.) | 1296 | 1320 or higher | 1320 or higher | 1310 | 1320 or higher | 1320 or higher | 1275 |
| Photoelastic constant (nm/MPa/cm) | (29.0) | (29.4) | (29.8) | (29.6) | (28.7) | (29.6) | (28.9) |
| Dielectric constant | (6.55) | (6.43) | (6.45) | (6.51) | (6.54) | (6.44) | (6.55) |

TABLE 2

| Mol % | Example 8 | Example 9 | Example 10 | Example 11 | Example 12 | Example 13 |
|---|---|---|---|---|---|---|
| SiO$_2$ | 67.9 | 67.9 | 67.1 | 67.0 | 68.7 | 68.4 |
| Al$_2$O$_3$ | 13.5 | 13.5 | 13.5 | 13.5 | 14.0 | 13.5 |
| B$_2$O$_3$ | 0 | 0 | 0 | 0 | 0.5 | 0 |
| MgO | 9.0 | 9.0 | 9.8 | 9.7 | 7.1 | 7.6 |
| CaO | 8.6 | 7.1 | 5.3 | 5.4 | 6.5 | 7.1 |
| SrO | 1.0 | 2.5 | 4.3 | 4.4 | 3.2 | 3.4 |
| BaO | 0 | 0 | 0 | 0 | 0 | 0 |
| ZrO$_2$ | 0 | 0 | 0 | 0 | 0 | 0 |
| MgO + CaO + SrO + BaO | 18.6 | 18.6 | 19.4 | 19.5 | 16.8 | 18.1 |
| MgO/(Mg + CaO + SrO + BaO) | 0.48 | 0.48 | 0.51 | 0.50 | 0.42 | 0.42 |
| MgO/(MgO + CaO) | 0.51 | 0.56 | 0.65 | 0.64 | 0.52 | 0.52 |
| MgO/(MgO + SrO) | 0.90 | 0.78 | 0.78 | 0.69 | 0.69 | 0.69 |
| Al$_2$O$_3$ × (MgO/(MgO + CaO + SrO + BaO)) | 6.48 | 6.48 | 6.89 | 6.75 | 5.88 | 5.67 |
| Average thermal expansion coefficient (×10$^{-7}$/° C.) | 36.3 | 38.0 | 38.2 | 39.7 | 36.4 | 38.1 |
| Strain point (° C.) | (740) | (740) | (735) | (733) | 737 | 744 |
| Glass transition point (° C.) | 791 | 792 | 785 | 783 | 796 | 796 |
| Specific gravity | 2.55 | 2.57 | 2.60 | 2.60 | 2.56 | 2.57 |
| Young's modulus (GPa) | 87.9 | (89.3) | 89.3 | (90.5) | 90.8 | 90.9 |
| $T_2$ (° C.) | 1653 | 1656 | 1647 | 1644 | 1705 | 1698 |
| $T_4$ (° C.) | 1309 | 1310 | 1303 | 1299 | 1327 | 1321 |
| Devitrification temperature (° C.) | 1295 | 1285 | 1285 | 1290 | 1285 | 1295 |
| Photoelastic constant (nm/MPa/cm) | (30.0) | (29.6) | (28.8) | (28.8) | (30.0) | (29.8) |
| Dielectric constant | (6.53) | (6.51) | (6.59) | (6.60) | (6.34) | (6.46) |

TABLE 3

| Mol % | Example 14 | Example 15 | Example 16 | Example 17 | Example 18 | Example 19 | Example 20 |
|---|---|---|---|---|---|---|---|
| $SiO_2$ | 66.5 | 66.5 | 66.2 | 66.2 | 67.5 | 67.5 | 67.5 |
| $Al_2O_3$ | 13 | 13.2 | 13.3 | 13.7 | 13.5 | 13.8 | 13.3 |
| $B_2O_3$ | 0 | 0 | 0 | 0 | 0.5 | 1 | 0 |
| MgO | 12.7 | 12.2 | 10.5 | 11.3 | 10.7 | 9.8 | 11.1 |
| CaO | 4.7 | 5.5 | 8.5 | 4.9 | 4.5 | 4.5 | 5.2 |
| SrO | 3.1 | 2.6 | 1.5 | 3.9 | 3.3 | 3.4 | 2.3 |
| BaO | 0 | 0 | 0 | 0 | 0 | 0 | 0.6 |
| $ZrO_2$ | 0 | 0 | 0 | 0 | 0 | 0 | 0 |
| MgO + CaO + SrO + BaO | 20.5 | 20.3 | 20.5 | 20.1 | 18.5 | 17.7 | 19.2 |
| MgO/(Mg + CaO + SrO + BaO) | 0.62 | 0.60 | 0.51 | 0.56 | 0.58 | 0.55 | 0.58 |
| MgO/(MgO + CaO) | 0.73 | 0.69 | 0.55 | 0.70 | 0.70 | 0.69 | 0.68 |
| MgO/(MgO + SrO) | 0.80 | 0.82 | 0.88 | 0.74 | 0.76 | 0.74 | 0.83 |
| $Al_2O_3$ × (MgO/(MgO + CaO + SrO + BaO)) | 8.05 | 7.93 | 6.81 | 7.70 | 7.81 | 7.64 | 7.69 |
| Average thermal expansion coefficient (×$10^{-7}$/° C.) | 37.7 | 37.3 | 39.1 | 38.7 | 36.2 | 35.5 | (35.9) |
| Strain point (° C.) | (726) | (729) | (732) | (730) | (731) | (730) | (741) |
| Glass transition point (° C.) | 794 | 791 | 795 | 794 | 796 | 793 | |
| Specific gravity | 2.58 | 2.58 | 2.57 | 2.60 | 2.57 | 2.56 | (2.56) |
| Young's modulus (GPa) | 91.3 | 91.4 | 91.4 | 90.7 | 89.8 | 89.1 | (88.8) |
| $T_2$ (° C.) | 1649 | 1649 | (1629) | 1653 | (1647) | 1677 | (1681) |
| $T_4$ (° C.) | 1294 | 1296 | (1273) | 1300 | (1310) | 1315 | (1312) |
| Devitrification temperature (° C.) | 1312 | 1312 | | 1312 | | 1312 | |
| Photoelastic constant (nm/MPa/cm) | 29.9 | 29.6 | 30.0 | 28.9 | 29.2 | 28.0 | (29.4) |
| Dielectric constant | (6.66) | (6.66) | (6.73) | (6.67) | (6.46) | (6.39) | (6.62) |

TABLE 4

| Mol % | Example 21 | Example 22 | Example 23 | Example 24 | Example 25 | Example 26 | Example 27 |
|---|---|---|---|---|---|---|---|
| $SiO_2$ | 67.5 | 67.5 | 67.5 | 66.1 | 66.1 | 67.6 | 67 |
| $Al_2O_3$ | 12.7 | 13.3 | 13.7 | 14.1 | 13.8 | 13 | 13.7 |
| $B_2O_3$ | 0 | 0 | 0.5 | 1 | 0 | 0 | 0.8 |
| MgO | 11.3 | 9.3 | 8.8 | 8.8 | 8.5 | 8.2 | 5 |
| CaO | 5.4 | 6.5 | 7.3 | 5.5 | 8.3 | 8.8 | 11 |
| SrO | 2.5 | 3.4 | 2.2 | 4.5 | 3.3 | 2.4 | 2.5 |
| BaO | 0 | 0 | 0 | 0 | 0 | 0 | 0 |
| $ZrO_2$ | 0.6 | 0 | 0 | 0 | 0 | 0 | 0 |
| MgO + CaO + SrO + BaO | 19.2 | 19.2 | 18.3 | 18.8 | 20.1 | 19.4 | 18.5 |
| MgO/(Mg + CaO + SrO + BaO) | 0.59 | 0.48 | 0.48 | 0.47 | 0.42 | 0.42 | 0.27 |
| MgO/(MgO + CaO) | 0.68 | 0.59 | 0.55 | 0.62 | 0.51 | 0.48 | 0.31 |
| MgO/(MgO + SrO) | 0.82 | 0.73 | 0.80 | 0.66 | 0.72 | 0.77 | 0.67 |
| $Al_2O_3$ × (MgO/(MgO + CaO + SrO + BaO)) | 7.47 | 6.44 | 6.59 | 6.60 | 5.84 | 5.49 | 3.70 |
| Average thermal expansion coefficient (×$10^{-7}$/° C.) | (35.2) | 38.4 | 37.0 | 38.4 | 39.6 | 39.9 | 39.3 |
| Strain point (° C.) | (745) | (734) | (736) | (727) | (734) | (736) | (736) |
| Glass transition point (° C.) | | 795 | 798 | 792 | 796 | 797 | 800 |
| Specific gravity | (2.55) | 2.58 | 2.55 | 2.60 | 2.60 | 2.57 | 2.57 |
| Young's modulus (GPa) | (88.8) | 89.9 | 89.9 | 89.2 | 90.6 | 86.7 | 84.7 |
| $T_2$ (° C.) | (1674) | (1646) | (1662) | 1653 | (1622) | 1670 | (1664) |
| $T_4$ (° C.) | (1310) | (1314) | (1312) | 1299 | (1297) | 1309 | (1319) |
| Devitrification temperature (° C.) | | | | 1287 | | 1287 | |
| Photoelastic constant (nm/MPa/cm) | (29.7) | 27.9 | 28.4 | 29.1 | 28.0 | 29.0 | 27.6 |
| Dielectric constant | (6.60) | (6.56) | (6.49) | (6.55) | (6.72) | (6.58) | (6.55) |

TABLE 5

| Mol % | Example 28 | Example 29 | Example 30 | Example 31 |
|---|---|---|---|---|
| $SiO_2$ | 66.5 | 66.8 | 67.5 | 67.5 |
| $Al_2O_3$ | 13.5 | 13.6 | 13.3 | 12.7 |
| $B_2O_3$ | 0.5 | 1.2 | 0 | 0 |
| MgO | 9 | 6.2 | 8.2 | 8.4 |
| CaO | 4.5 | 9.3 | 7.9 | 8.1 |
| SrO | 6 | 2.9 | 2.5 | 2.7 |

TABLE 5-continued

| Mol % | Example 28 | Example 29 | Example 30 | Example 31 |
|---|---|---|---|---|
| BaO | 0 | 0 | 0.6 | 0 |
| $ZrO_2$ | 0 | 0 | 0 | 0.6 |
| MgO + CaO + SrO + BaO | 19.5 | 18.4 | 19.2 | 19.2 |
| MgO/(Mg + CaO + SrO + BaO) | 0.46 | 0.34 | 0.43 | 0.44 |
| MgO/(MgO + CaO) | 0.67 | 0.40 | 0.51 | 0.51 |
| MgO/(MgO + SrO) | 0.60 | 0.68 | 0.77 | 0.76 |
| $Al_2O_3$ × (MgO/(MgO + CaO + SrO + BaO)) | 6.23 | 4.58 | 5.68 | 5.56 |
| Average thermal expansion coefficient (×$10^{-7}$/° C.) | 39.0 | 39.2 | (37.9) | (37.2) |
| Strain point (° C.) | (726) | (731) | (740) | (744) |
| Glass transition point (° C.) | 790 | 792 | | |
| Specific gravity | 2.56 | 2.62 | (2.58) | (2.57) |
| Young's modulus (GPa) | 84.7 | 85.4 | (89) | (89) |
| $T_2$ (° C.) | (1612) | 1661 | (1672) | (1665) |
| $T_4$ (° C.) | (1317) | 1302 | (1314) | (1312) |
| Devitrification temperature (° C.) | | 1312 | | |
| Photoelastic constant (nm/MPa/cm) | 29.7 | 29.7 | (29.3) | (29.6) |
| Dielectric constant | (6.58) | (6.50) | (6.56) | (6.54) |

As is apparent from the tables, the glasses of the examples are all that the thermal expansion coefficient is low as $30\times10^{-7}$ to $40\times10^{-7}$/° C., and the strain point is high as 725° C. or higher. It is seen that the glasses can sufficiently withstand heat treatment at high temperature.

The temperature $T_2$ giving an indication of melting performance is relatively low as 1,710° C. or lower, and melting is easy. The temperature $T_4$ giving an indication of formability is 1,320° C. or lower, and forming by a float process is easy. Furthermore, the devitrification temperature is 1,350° C. or lower. Therefore, it is considered that the glasses are free from the trouble that devitrification occurs during float forming.

The photoelastic constant is 31 nm/MPa/cm or less, and when the glasses are used as a glass substrate for a liquid crystal display, decrease in contrast can be inhibited.

Furthermore, the dielectric constant is 5.6 or more, and when the glasses are used as a glass substrate for In-Cell type touch panel, sensing sensitivity of a touch sensor is improved.

While the present invention has been described in detail with reference to specific embodiments thereof, it will be apparent to one skilled in the art that various changes and modifications can be made therein without departing from the spirit and scope thereof.

Incidentally, the present application is based on Japanese Patent Application No. 2010-272674 filed on Dec. 7, 2010, and the contents are incorporated herein by reference.

INDUSTRIAL APPLICABILITY

The alkali-free glass of the present invention has high strain point, can be formed by a float process, and is suitable for uses such as a display substrate and a photomask substrate. Further, the alkali-free glass is also suitable for uses such as a substrate for solar cell.

The invention claimed is:

1. An alkali-free glass having a strain point of 725° C. or higher, an average thermal expansion coefficient at from 50 to 300° C. of from $30\times10^{-7}$ to $40\times10^{-7}$/° C., a temperature $T_2$ at which a glass viscosity is $10^2$ dPa·s of 1,710° C. or lower, a temperature $T_4$ at which a glass viscosity is $10^4$ dPa·s of 1,320° C. or lower, and a devitrification temperature of 1,350° C. or lower, the alkali-free glass comprising, in terms of mol % on the basis of oxides:

| | |
|---|---|
| $SiO_2$ | 66 to 70, |
| $Al_2O_3$ | 12 to 14.5, |
| $B_2O_3$ | 0 to 1.5, |
| MgO | more than 9.5 and 11.5 or less, |
| CaO | 4 to 9, |
| SrO | 0.5 to 4.5, |
| BaO | 0 to 1, and |
| $ZrO_2$ | 0 to 2, | wherein MgO+CaO+SrO+BaO is from 17 to 21,
MgO/(MgO+CaO+SrO+BaO) is 0.4 or more,
MgO/(MgO+CaO) is 0.4 or more,
MgO/(MgO+SrO) is 0.6 or more, and
the alkali-free glass does not substantially contain an alkali metal oxide.

2. The method for producing the alkali-free glass according to claim 1, wherein a silica sand, in which a median diameter $D_{50}$ is from 20 to 27 μm, a proportion of particles having a particle size of 2 μm or less is 0.3 vol % or less, and a proportion of particles having a particle size of 100 μm or more is 2.5 vol % or less, is used as a silicon source of $SiO_2$.

3. The method for producing the alkali-free glass according to claim 1, wherein an alkaline earth metal source containing a hydroxide of an alkaline earth metal in an amount of from 15 to 100 mol % (in terms of MO, provided that M is an alkaline earth metal element, and hereinafter the same) of 100 mol % of the alkaline earth metal source is used as the alkaline earth metal source of MgO, CaO, SrO and BaO.

4. The method for producing the alkali-free glass according to claim 1, wherein a silica sand, in which a median diameter $D_{50}$ is from 20 to 27 μm, a proportion of particles having a particle size of 2 μm or less is 0.3 vol % or less, and a proportion of particles having a particle size of 100 μm or more is 2.5 vol % or less, is used as a silicon source of $SiO_2$; and an alkaline earth metal source containing a hydroxide of an alkaline earth metal in an amount of from 15 to 100 mol % (in terms of MO, provided that M is an alkaline earth metal element, and hereinafter the same) of 100 mol % of the alkaline earth metal source is used as the alkaline earth metal source of MgO, CaO, SrO and BaO.

5. The alkali-free glass according to claim 1, wherein SrO is included in an amount of 2 to 4.5 mol % on the basis of oxides.

6. The alkali-free glass according to claim 1 having a glass transition point of 760° C. or higher, a specific gravity of 2.65 or less, a Young's modulus of 84 GPa or more, the devitrification temperature of 1,340° C. or lower, a photoelastic constant of 31 nm/MPa/cm or less, and a dielectric constant of 5.6 or more.

\* \* \* \* \*